United States Patent
Berkman

(10) Patent No.: US 7,358,808 B2
(45) Date of Patent: Apr. 15, 2008

(54) METHOD AND DEVICE FOR AMPLIFICATION OF DATA SIGNALS OVER POWER LINES

(75) Inventor: William H. Berkman, New York, NY (US)

(73) Assignee: Current Technologies, LLC, Germantown, MD (US)

( * ) Notice: Subject to any disclaimer, the term of this patent is extended or adjusted under 35 U.S.C. 154(b) by 494 days.

(21) Appl. No.: 11/156,612

(22) Filed: Jun. 21, 2005

(65) Prior Publication Data

US 2007/0001821 A1    Jan. 4, 2007

(51) Int. Cl.
H03F 3/04    (2006.01)
(52) U.S. Cl. .................. 330/250; 330/302
(58) Field of Classification Search .......... 330/250, 330/123, 302, 306, 310
See application file for complete search history.

(56) References Cited

U.S. PATENT DOCUMENTS

| | | |
|---|---|---|
| 3,911,415 A | 10/1975 | Whyte |
| 3,942,168 A | 3/1976 | Whyte |
| 3,942,170 A | 3/1976 | Whyte |
| 3,944,723 A | 3/1976 | Fong |
| 3,967,264 A | 6/1976 | Whyte et al. |
| 3,973,087 A | 8/1976 | Fong |
| 3,973,240 A | 8/1976 | Fong |
| 4,004,110 A | 1/1977 | Whyte |
| 4,250,489 A | 2/1981 | Dudash et al. |
| 4,393,513 A * | 7/1983 | Yokogawa et al. ...... 455/242.2 |
| 4,426,737 A * | 1/1984 | Mori .................. 455/260 |
| 4,475,209 A | 10/1984 | Udren |
| 4,599,598 A | 7/1986 | Komoda et al. |
| 4,638,298 A | 1/1987 | Spiro |
| 4,642,607 A | 2/1987 | Strom et al. |
| 5,551,075 A * | 8/1996 | Caux et al. .............. 455/333 |
| 5,726,980 A | 3/1998 | Rickard |
| 5,818,821 A | 10/1998 | Schurig |
| 5,870,016 A | 2/1999 | Shresthe |
| 5,949,327 A | 9/1999 | Brown |
| 5,978,371 A | 11/1999 | Mason, Jr. et al. |
| 6,373,377 B1 | 4/2002 | Sacca et al. |

(Continued)

FOREIGN PATENT DOCUMENTS

EP    1 251 646 A2    10/2002

(Continued)

OTHER PUBLICATIONS

"EMETCON Automated Distribution System: Communications Guide", *Westinghouse ABB Power T & D Company Technical Manual 42-6001A..* (Sep. 1989), 1-55.

(Continued)

*Primary Examiner*—Henry Choe
(74) *Attorney, Agent, or Firm*—Mel Barnes; Capital Legal Group, LLC

(57) ABSTRACT

A device for bi-directional amplification of data signals over power lines is disclosed. In one embodiment, the device includes a bandpass filter, a frequency converter and an amplifier. The bandpass filter filters out undesired frequencies and the frequency converter converts the frequency band of the data signals to a different frequency band. The output of the filter is provided to the amplifier for amplifying the frequency converted data signals for transmission over power line.

34 Claims, 7 Drawing Sheets

U.S. PATENT DOCUMENTS

| | | |
|---|---|---|
| 6,965,303 B2 | 11/2005 | Mollenkopf |
| 6,977,578 B2 | 12/2005 | Kline |
| 6,980,091 B2 | 12/2005 | White et al. |
| 6,998,962 B2 | 2/2006 | Cope et al. |
| 2002/0109585 A1 | 8/2002 | Sanderson |
| 2003/0224784 A1 | 12/2003 | Hunt et al. |
| 2004/0067745 A1 | 4/2004 | Belsak |
| 2004/0110483 A1 | 6/2004 | Mollenkopf |
| 2004/0135676 A1 | 7/2004 | Berkman et al. |
| 2004/0157551 A1 | 8/2004 | Gainey et al. |
| 2004/0163128 A1 | 8/2004 | Phillips et al. |
| 2004/0168199 A1 | 8/2004 | Phillips et al. |
| 2004/0242185 A1 | 12/2004 | Lee |
| 2005/0040809 A1 | 2/2005 | Uber, III et al. |
| 2005/0068223 A1 | 3/2005 | Vavik |
| 2005/0168326 A1 | 8/2005 | White et al. |
| 2005/0220004 A1 | 10/2005 | Vollmer et al. |
| 2006/0044076 A1 | 3/2006 | Law |
| 2006/0045105 A1 | 3/2006 | Dobosz et al. |
| 2006/0073805 A1 | 4/2006 | Zumkeller et al. |

FOREIGN PATENT DOCUMENTS

| | | |
|---|---|---|
| GB | 2 293 950 A | 4/1996 |
| JP | 10200544 A2 | 7/1998 |
| WO | WO-03/030396 A2 | 4/2003 |
| WO | WO 2004102868 | 11/2004 |

OTHER PUBLICATIONS

"Outlook Conference 2004: Amperion Deployment Overview", *Primen Conference*, (May 7, 2004), 1-10.

* cited by examiner

METHOD AND DEVICE FOR AMPLIFICATION OF DATA SIGNALS OVER POWER LINES

FIELD OF THE INVENTION

The present invention generally relates to data communications over a power distribution system and more particularly, to amplification of data signals along a power line.

BACKGROUND OF THE INVENTION

Well-established power distribution systems exist throughout most of the United States, and other countries, which provide power to customers via power lines. With some modification, the infrastructure of the existing power distribution systems can be used to provide data communication in addition to power delivery, thereby forming a power line communication system (PLCS). In other words, existing power lines that already have been run to many homes and offices, can be used to carry data signals to and from the homes and offices. It will be understood that for purposes of this specification, the term "data signals" will encompass any information carrying signal such as packetized data using protocols such as the transmission control protocol (TCP) and internet protocol (IP) as well as non-packetized framed data such as video or voice. These data signals are communicated on and off the power lines at various points in the power line communication system, such as, for example, near homes, offices, Internet service providers, and the like.

While the concept may sound simple, there are many challenges to overcome in order to use power lines for data communication. Power lines are not designed to provide high speed data communications and are very susceptible to interference. Additionally, federal regulations limit the amount of radiated energy of a power line communication system, which therefore limits the strength of the data signal that can be injected onto power lines. Consequently, due to the attenuation of the power lines, data signals typically will travel only a relatively short distance on power lines even though power transmission distances may vary from location to location.

An exemplary portion of a power line communication system is shown in FIG. 2 and includes one or more bypass devices (BD) 80 to communicate data signals around the distribution transformer that would otherwise filter such data signals. In this example, BD 80 serves as a gateway between the LV power lines and the MV power line and communicates signals to and from the user devices at the customer premises (CP), preventing them from passing through the transformer or significantly degrading them. Thus, BD 80 is the gateway between the LV power line subnet (i.e., the devices that are communicatively coupled to the LV power lines) and the MV power line and communicates signals to and from user devices at the customer premises (CP) via the low voltage subnet 61.

The BD 80 provides communication services for the user, which may include security management, routing of IP packets, filtering data, access control, service level monitoring, signal processing and modulation/demodulation of signals transmitted over the power lines.

The exemplary PLCS also includes a backhaul point 10. The backhaul point 10 is an interface and gateway between a portion of a PLCS (e.g., an MV run) and a traditional non-power line telecommunications network. One or more backhaul points (BP) 10 are communicatively coupled to an aggregation point (AP) 20 that in many embodiments may be at (e.g., co-located with), or connected to, the point of presence to the Internet. The BP 10 may be connected to the AP 20 using any available mechanism, including fiber optic conductors, T-carrier, Synchronous Optical Network (SONET), or wireless techniques well known to those skilled in the art. Thus, the BP 10 may include a transceiver suited for communicating through the communication medium.

As discussed above, due to the design of power lines, data signals which are typically high frequency signals superimposed on the low frequency power signals, are attenuated very quickly. Thus, the PLCS network design often must install numerous backhaul points, which further requires installing backhaul media to connect the backhaul point to the upstream device. However, this can be inefficient and expensive.

A proposed solution has been to insert data signal repeaters along MV power lines to periodically regenerate data signals. However, as will be more fully discussed below, repeaters may introduce unwanted latency to data signals. Such latency, while tolerable for some data communications (e.g., latency insensitive data such as web page data), is undesirable for more time sensitive data such as voice or video.

Finally, there may be concern that any device that interfaces with the MV power line be designed to minimize any potential interruption of power service for a large number of customer premises. One must be mindful that the primary purpose of a power line system is the delivery of power and the potential for interruption of power delivery must be minimized by reducing the need for physically cutting into the MV power line to install a device.

Thus, there is a need for a device and method that enables amplification of data signals along the power line so that the number of backhaul points required for effective data signal transmission may be reduced. In addition, there is a need for a device that provides amplification to power line communication signals that can be installed without cutting the power line and that provides low latency amplification.

These and other advantages may be provided by various embodiments of the present invention.

SUMMARY OF THE INVENTION

The present invention provides a device for amplification of data signals over power lines. In example embodiment, the invention is a device for amplifying data signals on a power line conductor, comprising a bandpass filter having an input port and an output port, wherein the input port is configured to be communicatively coupled to the power line conductor; an amplifier having an input port and an output port; wherein the amplifier output port is configured to be communicatively coupled to the power line conductor; a frequency converter (FC) having an input port and an output port; and wherein the FC input port is communicatively coupled to the filter output port and the FC output port is communicatively coupled to the amplifier input port.

In example embodiment, the invention a first switch and a second switch, the switches configured for operating in an open state and a closed state, the switches having an input port and an output port, each of the switches having its input port communicatively coupled to the power line conductor; a first bandpass filter and a second bandpass filter, the filters having an input port and an output port, the input port of said first bandpass filter communicatively coupled to the output port of said first switch, the input port of the second bandpass filter communicatively coupled to the output port of the second switch; a first frequency converter (FC) and a second frequency converter (FC), the FCs having an input port and an output port, the input port of the first FC communicatively coupled to the output port of the first bandpass filter, the input port of the second FC communicatively coupled to the output port of the second bandpass filter; and a first amplifier and a second amplifier, the amplifiers having an input port and an output port, the input port of the first amplifier communicatively coupled to the output port of the first FC, the input port of second amplifier communicatively coupled to the output port of the second FC, the output ports of the first and the second amplifiers communicatively coupled to the power line conductor.

In still another example embodiment, the invention may include an array of N amplification devices, wherein each of the amplification devices is characterized by a unique transmitting frequency f, each of the amplification devices comprises a switch configured for operating in an open state and a closed state, the switch having an input port and an output port, each switch having its input port communicatively coupled to the power line conductor; a bandpass filter having an input port and an output port, the input port of the bandpass filter communicatively coupled to the output port of the switch; a frequency converter (FC) having an input port and an output port, the input port of the FC communicatively coupled to the output port of the bandpass filter; and an amplifier having an input port and an output port, the input port of the amplifier communicatively coupled to the output port of the FC, the output port of the amplifier communicatively coupled to the power line conductor; wherein each of the unique transmitting frequencies f is orthogonal to each of the other frequencies.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings.

DETAILED DESCRIPTION OF ILLUSTRATIVE EMBODIMENTS

In the following description, for purposes of explanation and not limitation, specific details are set forth, such as particular networks, communication systems, computers, terminals, devices, components, techniques, data and network protocols, software products and systems, operating systems, development interfaces, hardware, etc. in order to provide a thorough understanding of the present invention.

However, it will be apparent to one skilled in the art that the present invention may be practiced in other embodiments that depart from these specific details. Detailed descriptions of well-known networks, communication systems, computers, terminals, devices, components, techniques, data and network protocols, software products and systems, operating systems, development interfaces, and hardware are omitted so as not to obscure the description of the present invention.

Figure 1:
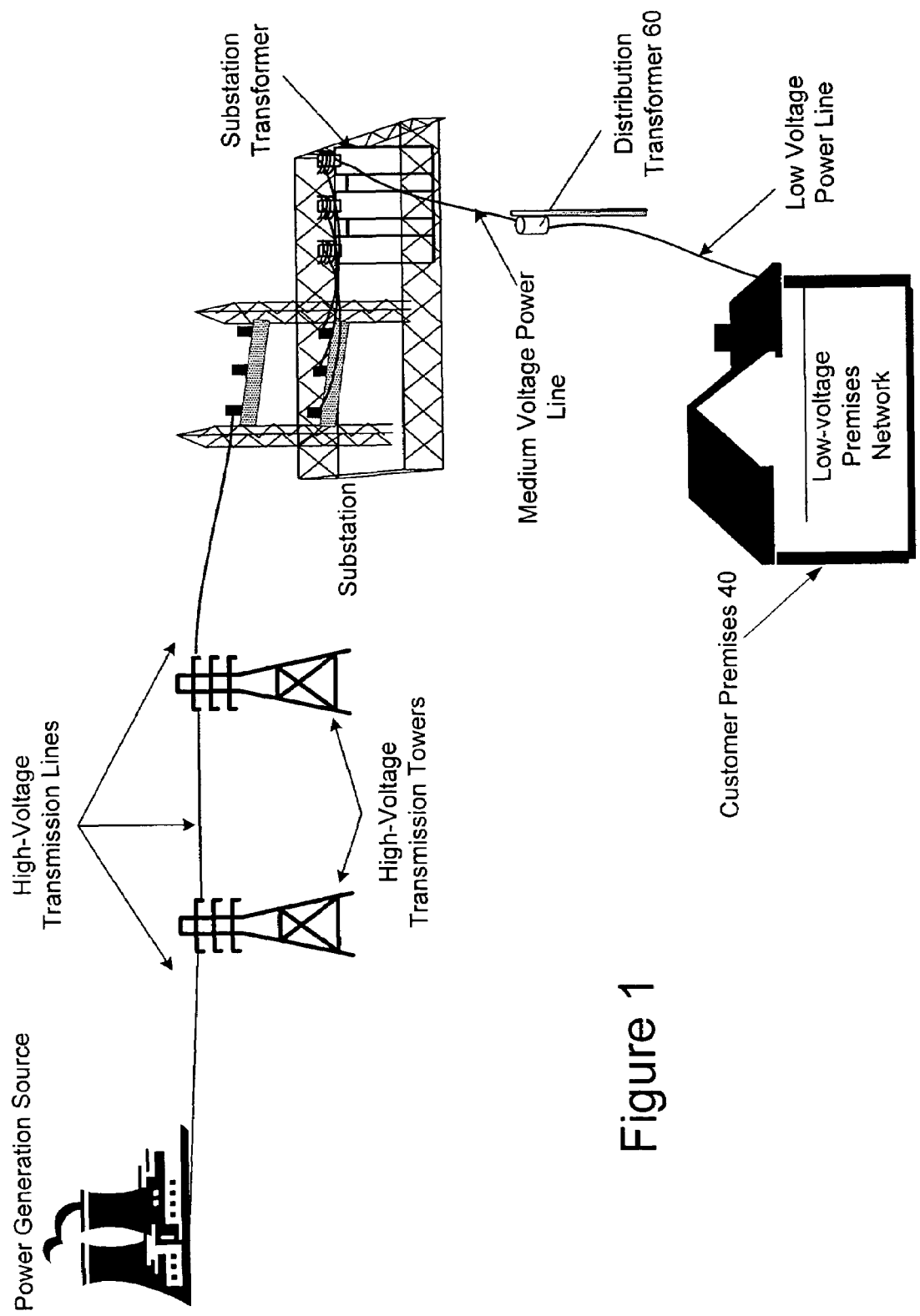
FIG. 1 is a diagram of an exemplary power distribution system with which the present invention may be employed.

A brief overview of the basic functions of a power distribution system and the superimposition of a basic power line communications system may be helpful in gaining fuller understanding of the invention. A more detailed explanation of the functions and components of a power line communications system can be found, for instance, in copending patent application Ser. No. 10/315,725, filed on Dec. 10, 2002, entitled "Power Line Communication Apparatus and Method of Using the Same", and hereby incorporated by reference in its entirety. Referring to FIG. 1, there is shown a typical power distribution system including components for power generation, power transmission, and power delivery. A transmission substation typically is used to increase the voltage from the power generation source to high voltage (HV) levels for long distance transmission on HV transmission lines to a substation. Typical voltages found on HV transmission lines range from 69 kilovolts (kV) to in excess of 800 kV.

In addition to HV transmission lines, power distribution systems include MV power lines and LV power lines. As discussed, MV typically ranges from about 1000 V to about 100 kV and LV typically ranges from about 100 V to about 1,000 V. Transformers are used to convert between the respective voltage portions, e.g., between the HV section and the MV section and between the MV section and the LV section. Transformers have a primary side for connection to a first voltage (e.g., the MV section) and a secondary side for outputting another (usually lower) voltage (e.g., the LV section). Such transformers are often referred to as distribution transformers or a step down transformers, because they "step down" the voltage to some lower voltage. Transformers, therefore, provide voltage conversion for the power distribution system. Thus, power is carried from substation transformer to a distribution transformer 60 over one or more MV power lines. Power is carried from the distribution transformer to the customer premises via one or more LV power lines.

In addition, a distribution transformer 60 may function to distribute one, two, three, or more phase voltages to the customer premises, depending upon the demands of the user. In the United States, for example, these local distribution transformers typically feed anywhere from one to ten homes, depending upon the concentration of the customer premises 40 in a particular area. Distribution transformers 60 may be pole-top transformers located on a utility pole, pad-mounted transformers located on the ground, or transformers located under ground level.

Figure 2:
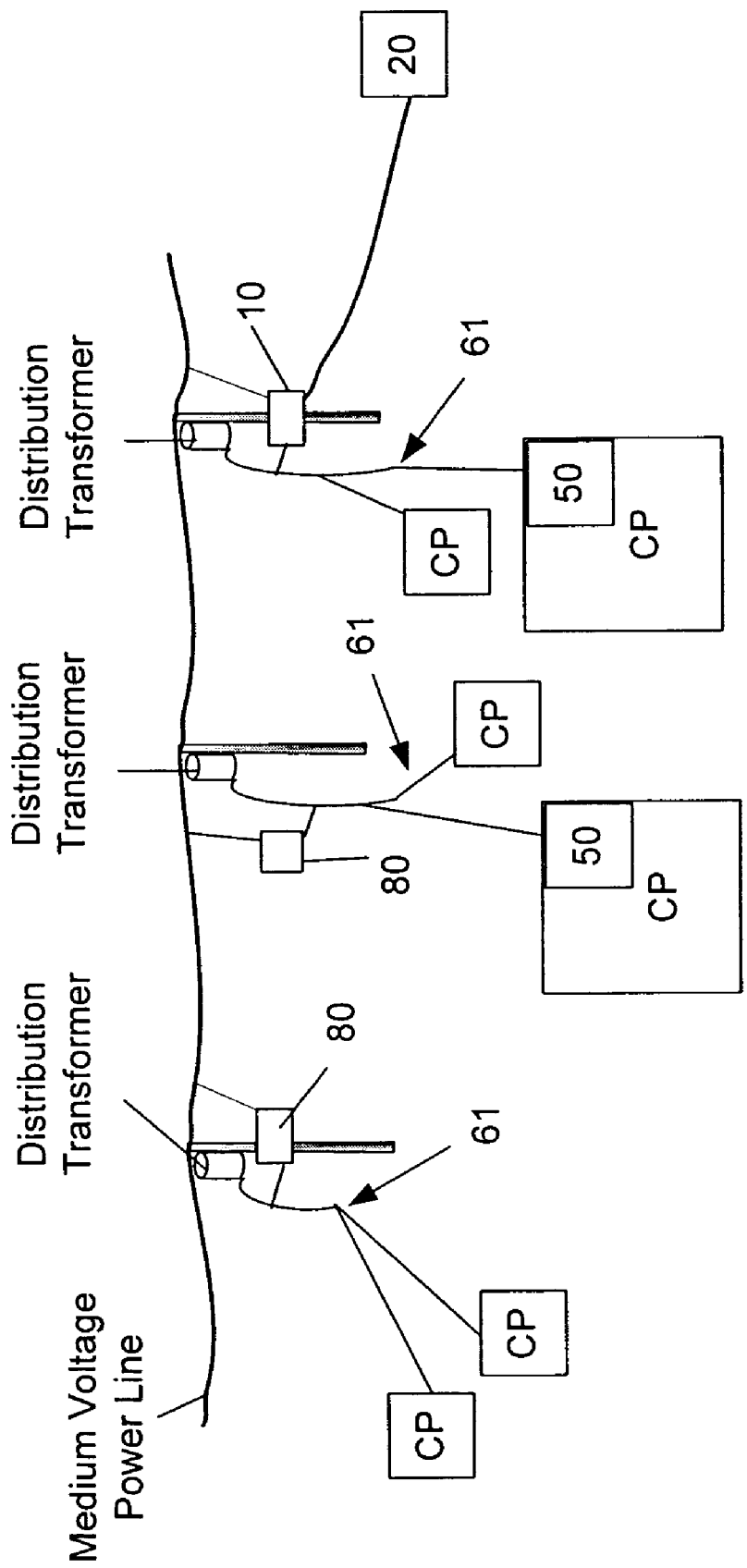
FIG. 2 is a diagram of a portion of an exemplary power line communications system, with which an example embodiment of the present invention may be used.

Referring to FIG. 2, an exemplary portion of a power line communication system is shown and includes one or more bypass devices 80 for communicating data signals around the distribution transformer that would otherwise filter such data signals, preventing them from passing through the transformer or significantly degrading them. Thus, the BD 80 is the gateway between the LV power line subnet (i.e., the devices that are communicatively coupled to the LV power lines) and the MV power line and communicates signals to and from user devices at the customer premises (CP) via the low voltage subnet 61. At the CP, typically a power line interface device 50 (sometimes referred to as a power line modem) provides an interface for user devices to access the PLCS.

BD 80 provides communication services for the user, which may include security management, routing of Internet Protocol (IP) packets, filtering data, access control, service level monitoring, signal processing and modulation/demodulation of signals transmitted over the power lines.

This example portion of a PLCS also includes a backhaul point 10. The backhaul point 10 is an interface and gateway between a portion of a PLCS (e.g., an MV run) and a traditional non-power line telecommunications network. One or more backhaul points (BP) 10 are communicatively coupled to an aggregation point (AP) 20 that in many embodiments may be at (e.g., co-located with), or connected to, the point of presence to the Internet. The BP 10 may be connected to the AP 20 using any available mechanism, including fiber optic conductors, T-carrier, Synchronous Optical Network (SONET), or wireless techniques well known to those skilled in the art. Thus, the BP 10 may include a transceiver suited for communicating through the communication medium.

AP 20 may include a conventional Internet Protocol (IP) data packet router and may be directly connected to an Internet backbone thereby providing access to the Internet. Alternatively, the AP 20 may be connected to a core router (not shown), which provides access to the Internet, or other communication network. Depending on the configuration of the PLCS, a plurality of APs 20 may be connected to a single core router which provides Internet access. The core router (or AP 20 as the case may be) may route voice traffic to and from a voice service provider and route Internet traffic to and from an Internet service provider and/or video provider. The routing of packets to the appropriate provider may be determined by any suitable means such as by including information in the data packets to determine whether a packet is voice. If the packet is voice, the packet may be routed to the voice service provider and, if not, the packet may be routed to the Internet service provider. Similarly, the packet may include information (which may be a portion of the address) to determine whether a packet is Internet data. If the packet is Internet data, the packet may be routed to the Internet service provider and, if not, the packet may be routed to the voice service provider. Additionally, if the packet includes voice, video or other time sensitive data, it may be accorded a higher priority to thereby reduce the latency thereof.

In some PLCS embodiments, there may a distribution point (not shown) between the BP 10 and the AP 20. The distribution point, which includes a router, may be coupled to a plurality of BPs 10 and provides routing functions between its BPs 10 and its AP 20. In one example embodiment, a plurality of BPs 10 are connected to each distribution point and each distribution point (of which there are a plurality) is coupled to the AP 20, which provides access to the Internet.

BD 80 typically transmits the data to (and receives the data from) the backhaul point 10, which, in turn, transmits the data to (and receives the data from) the AP 20. AP 20 then transmits the data to (and receives the data from) the appropriate destination (perhaps via a core router), which may be a network destination (such as an Internet address) in which case the packets are transmitted to, and pass through, numerous routers (herein routers are meant to include both network routers and switches) in order to arrive at the desired destination.

Figure 3:
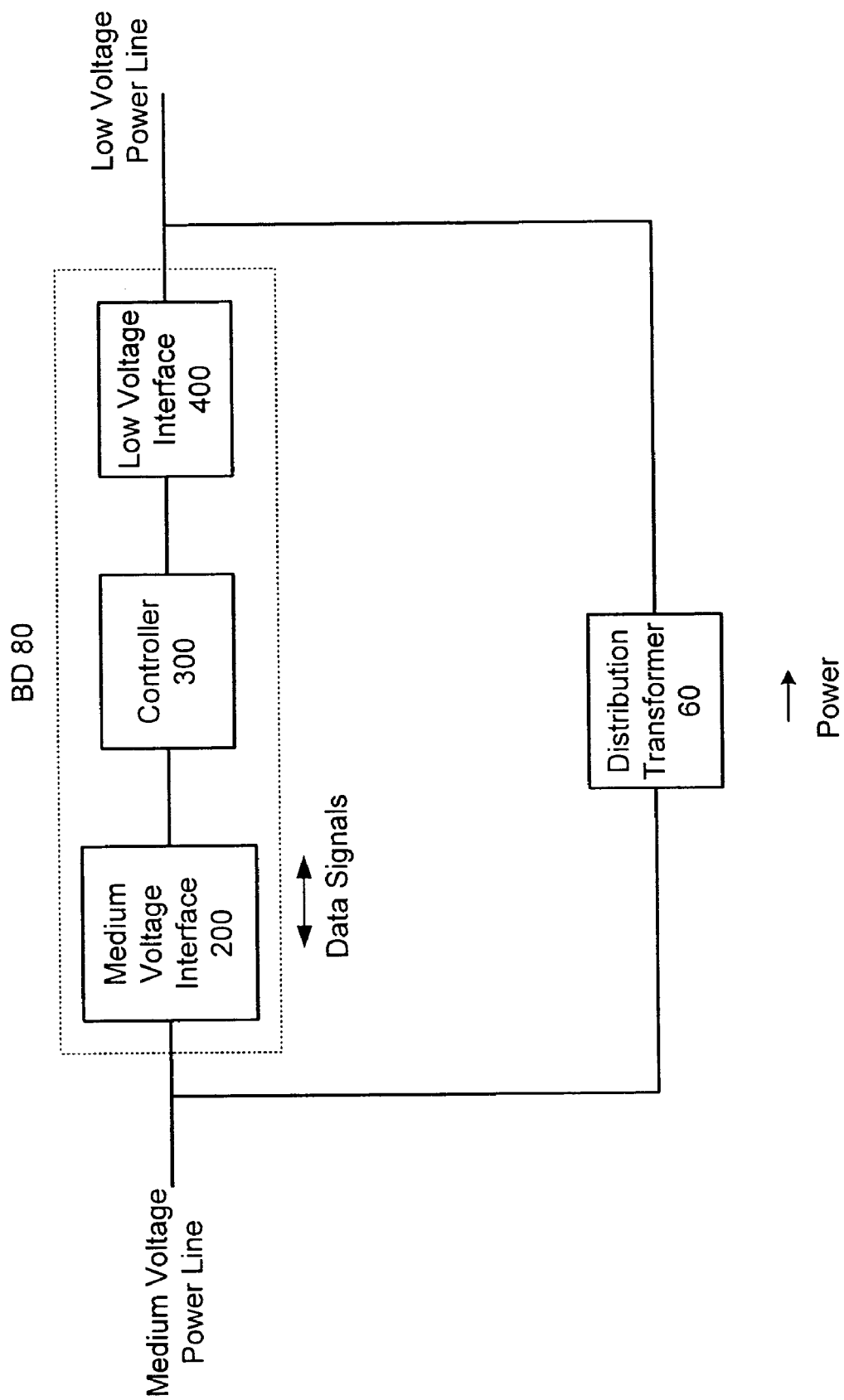
FIG. 3 is a block diagram of a bypass device for use in an exemplary power line communications system.

Referring to FIG. 3, a functional block diagram of a typical BD 80 is shown. BD 80 includes a MV power line interface (MVI) 200, a controller 300, and a LV power line interface (LVI) 400. The BD 80 is controlled by a programmable processor and associated peripheral circuitry, which form part of the controller 300. The controller 300 includes memory that stores, among other things, program code, which controls the operation of the processor. The LVI 400 may include a LV modem as well as a power line coupler and LV signal conditioner. The MVI 200 may include a MV modem, a MV signal conditioner and a power line coupler. Bi-directional communications around the distribution transformer 60 are provided by a first communications path from the LV power line to the MV power line and a second path from the MV power line to the LV power line.

BD 80 may also be configured to repeat data communications. The repeating functionality of the device allows the communications range of a BP 10 to be expanded such that communications devices (e.g., BDs 80) with unsatisfactory connectivity (e.g., due to noise or attenuation of signals) can be improved by repeating to make their connections satisfactory. In addition, the repeater functionality typically will extend the 'reach' of the BP 10 to include communications devices at distances that normally could not be reached by direct transmission between the device and the BP 10.

Repeater functionality may be enabled or disabled as desired by the operator. The repeating communications device may include a medium voltage port (for communications over the MV power line) and a wireless transceiver for communications to the user devices at the customer premises (e.g., instead of an LV port). Thus, such a bypass device may bypass the transformer without coupling to the LV power line at the transformer. In another example, the repeater functionality may be combined with the backhaul functionality.

However, a BD 80 configured to operate as a repeater may introduce unwanted latency to data signal communications. Specifically, hardware and software processing overhead introduced by modulating/demodulating data can cause undue latency, especially for packetized data. This latency, while tolerable for some data communications, may be undesirable for time sensitive applications such as voice and video communications.

Figure 4:
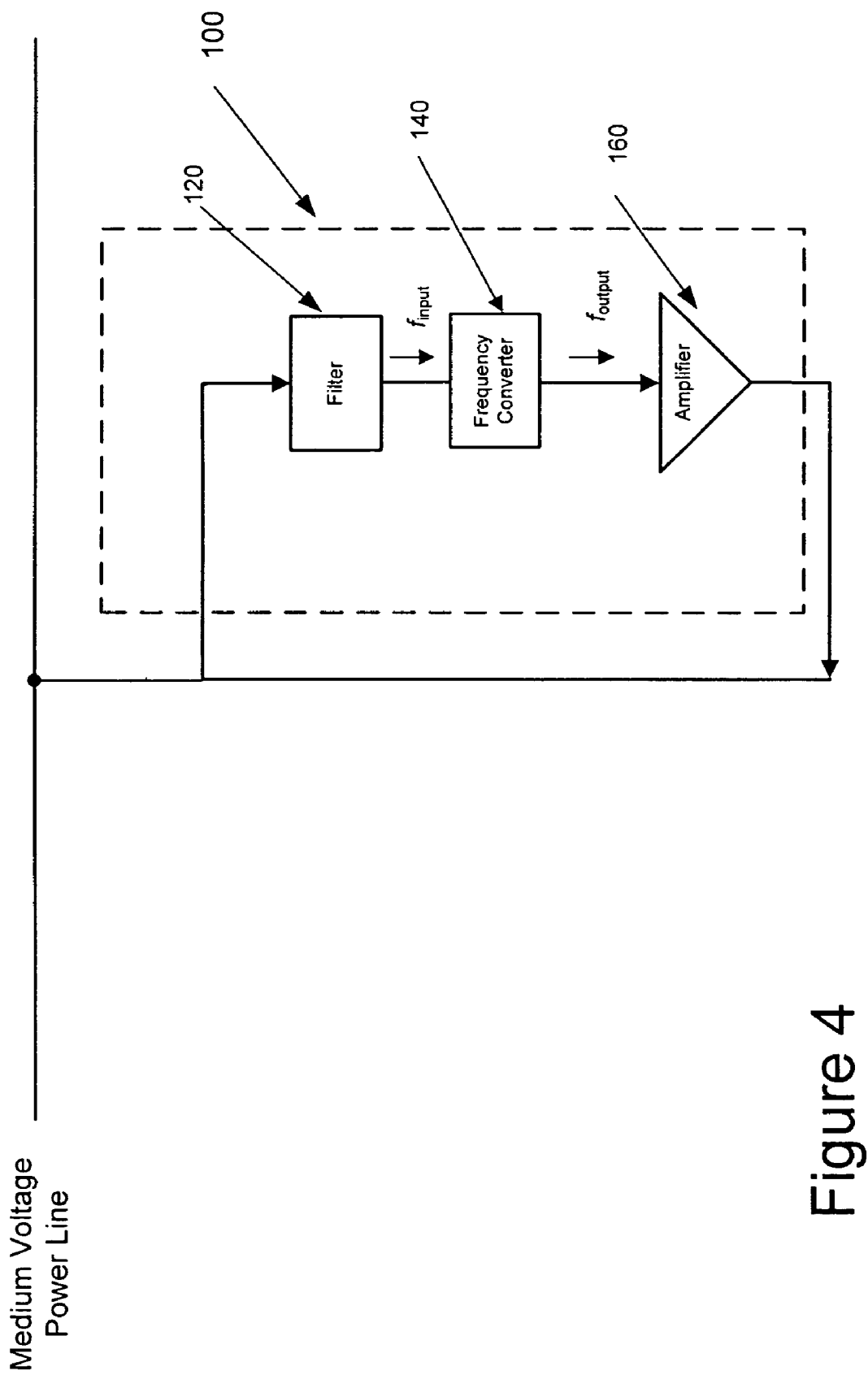
FIG. 4 is an amplification device in accordance with an example embodiment of the present invention.

The embodiment described below is an amplification device for amplifying data signals without the need for demodulating and modulating the high frequency data signals, and therefore avoiding undue latency. Referring now to FIG. 4, there is shown one example embodiment of the amplification device 100 in accordance with the principles of the invention. The amplification device is communicatively coupled to the MV power line and includes a filter 120, a frequency converter 140 and an amplifier 160.

Data signals transmitted along power lines are bidirectional and may be transmitted in full duplex mode using known techniques of frequency domain multiplexing. That is, the data signals transmitted in one direction are modulated onto a different high frequency signal than the data signals transmitted in the opposing direction. The data signals also be transmitted over a multiple phase power line conductors as well as a single phase.

In one embodiment, the amplification device 100 may include a MV coupler that couples the high frequency data signals from the MV power line by known capacitive or inductive coupling techniques. In one embodiment, frequencies from 0 to 100 Hz (i.e. power signals) are isolated (not coupled) by the coupler, while frequencies from 1 MHz to 50 MHz (i.e. data signals) are coupled between the amplification device and the MV power line. Alternatively, in another embodiment, the coupler may comprise a two port conductive as described in the reference incorporated herein.

Once the high frequency data signals are coupled from the MV power line, the data signals may be supplied to the filter 120. The filter 120 may be a bandpass filter configured to pass a band of desired frequency modulated data signals while impeding unwanted frequencies. Bandpass filters are well known in the art and will not be described in detail here. However, proper choice of frequency bands allows the amplification device to pass, for example, a frequency band of signals in one direction, essentially, creating a half-duplex amplifier. Alternatively, a frequency band of signals can be chosen so that data signals extracted from only one phase of a three phase power line conductor are amplified.

The output port of the filter 120 is communicatively coupled to a frequency converter 140. The frequency converter 140 converts the broadband frequency of the received data signals to another broadband frequency. Such frequency converters are known in the art and will not be described in detail here. In an example embodiment, the input frequency $f_{input}$ is not equal to the $f_{output}$ from the frequency converter and also may not overlap in frequency. Selection of $f_{input}$ and $f_{output}$ may be dependent upon the frequency spectrum available for data signal transmission. In a preferred embodiment, interference between $f_{input}$ and $f_{output}$ is minimized by a guard band of frequency interposed between $f_{input}$ and $f_{output}$. The guard band of frequency is selected so as to minimize the possible interference between $f_{input}$ and $f_{output}$. In a more preferred embodiment, $f_{input}$ and $f_{output}$ are chosen to be orthogonal to each other. Orthogonal frequencies prevent any interference and can be chosen to be superimposed upon each other and therefore there is no need for a guard band of frequency.

The amplifier 160 is an amplifier configured for amplifying the $f_{output}$ modulated data signal for suitable transmission to a BP 10, a BD 80, a repeater, or another amplification device 100. The gain of the amplifier 160 may be linear or nonlinear and may be configured depending upon the selection of broadband carrier frequency (i.e., $f_{output}$). In one embodiment, the gain of the amplifier is configured for suitable dynamic predistortion of the high frequency data signal for proper spectral purity requirements further down the medium voltage power line (to either a BP 10, BD 80 or another amplification device 100). For example, suitable dynamic predistortion may be characterized for a particular instance of the amplification device 100 depending on the type of physical path along the medium voltage power line (i.e., overhead or underground, physical topology, network topology, or distance to another device). Additionally, the amplifier may pre-emphasize certain frequencies.

Amplifier 160 may also apply signal conditioning after amplification of the data signal. Such signal conditioning may include applying an anti-aliasing filter and/or noise filtering. Additionally, some compensation for the higher attenuation along the power line for higher frequency bands may also be made by extra amplification to the amplified signal.

The output signal from the amplifier is injected on to the medium voltage power line for bi-directional transmission through either the any of the coupling techniques previously discussed. The output signal is also presented to the input port of the bandpass filter 120 but is impeded since the bandpass filter impedes unwanted frequencies.

Amplification device 100 may further include a power supply (not shown) composed of toroid with windings that form part of a coupling transformer. The power coupling device may inductively draw electrical energy from the MV power line to provide power to the components that comprises the amplification device. In an alternate embodiment, the power supply receives power from a low voltage power line.

Figure 5:
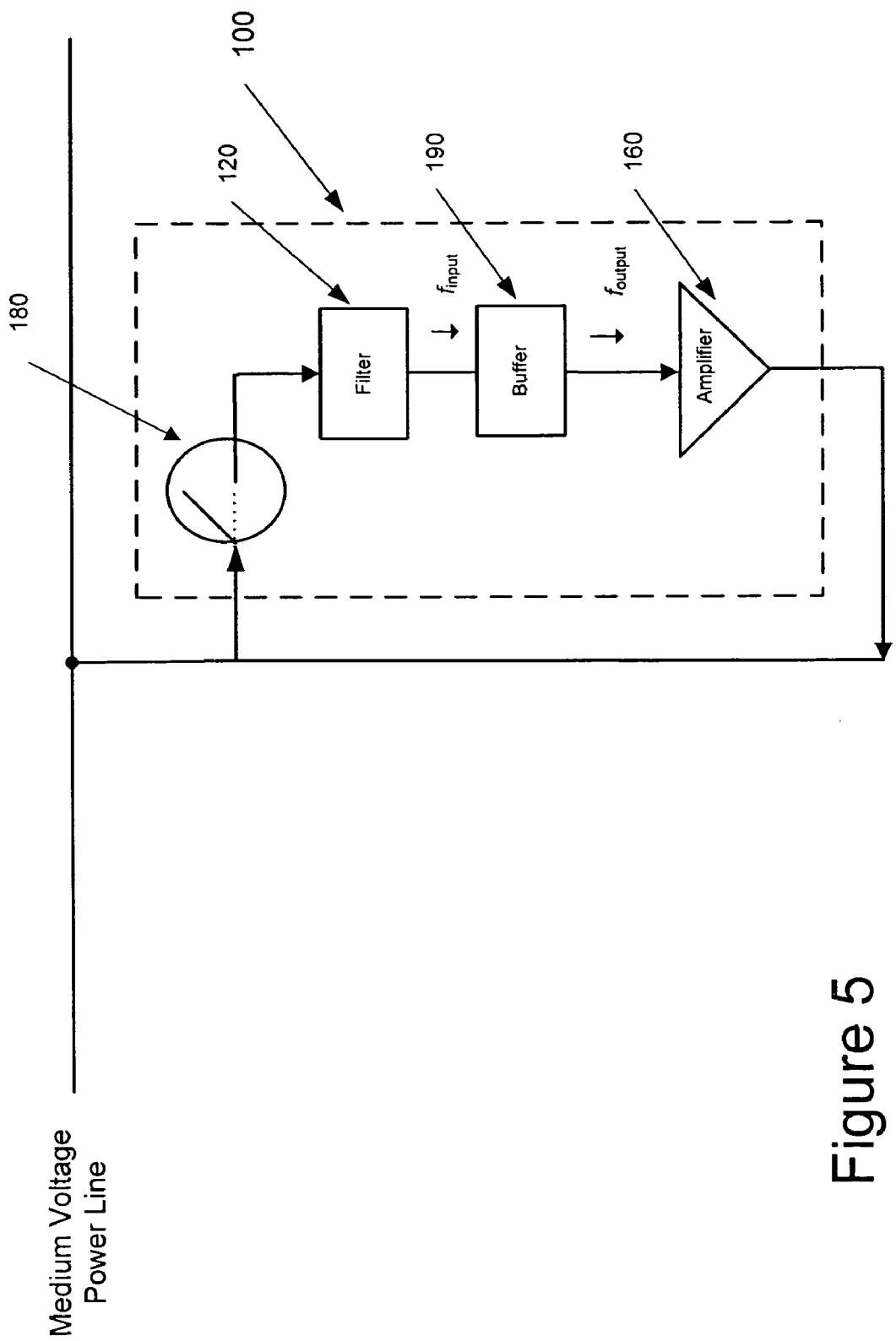
FIG. 5 is an amplification device in accordance with an example embodiment of the present invention.

Referring to FIG. 5, there is shown an alternative embodiment of the amplification device in accordance with the principles of the invention. Keeping in mind that like reference numerals refer to like parts from previous figures, this exemplary embodiment adds a switch 180 in series with the filter 120. The switch 180 is configured for operating in one of two states—open or closed. The switch performs switching functions so that data signals extracted from the medium voltage power line are coupled to the filter 120 when the switch is in a closed state. When the switch 180 is in an open state, there is no coupling of the data signals to the filter 120.

The switch 180 acts in conjunction with the amplifier 160 so that when the amplifier 160 begins to transmit an output signal, the switch simultaneously engages in an open state. Therefore, the amplifier output signal is coupled to the power line conductor and propagated along the conductor but is impeded from being presented to the filter 120. Conversely, when the amplifier 160 is not in a transmit state, the switch 180 is in a closed state so that data signals from the power line are presented to the filter 120. Switch 180 may be implemented as an ultra-fast diode with fast recovery times and may be actuated by the signal from the output of the amplifier 160, the buffer 190, or the filter 120 to provide the necessary coordination.

Significantly, this embodiment obviates the need for a frequency converter. Proper coordination of the switch 180 and the amplifier 160 ensures amplification of the data signal without the necessity of frequency conversion while preventing positive or circular feedback back to the amplifier. In other words, $f_{input}$ and $f_{output}$ may be identical.

In addition, the amplification device of this embodiment includes a buffer 190. The buffer 190, interposed between the amplifier 160 and the filter 120, assures that variable length IP packets are buffered until the entire IP packet is received before amplification and transmission by the amplifier 160. The buffer may additionally be configured to handle other types of packet like data (i.e. relay frame, TCP datagram). In one embodiment, the buffer may include a fast digital signal processor an memory for storing the digitized signal for a predetermined period (e.g., until the entire packet is received).

Figure 6:
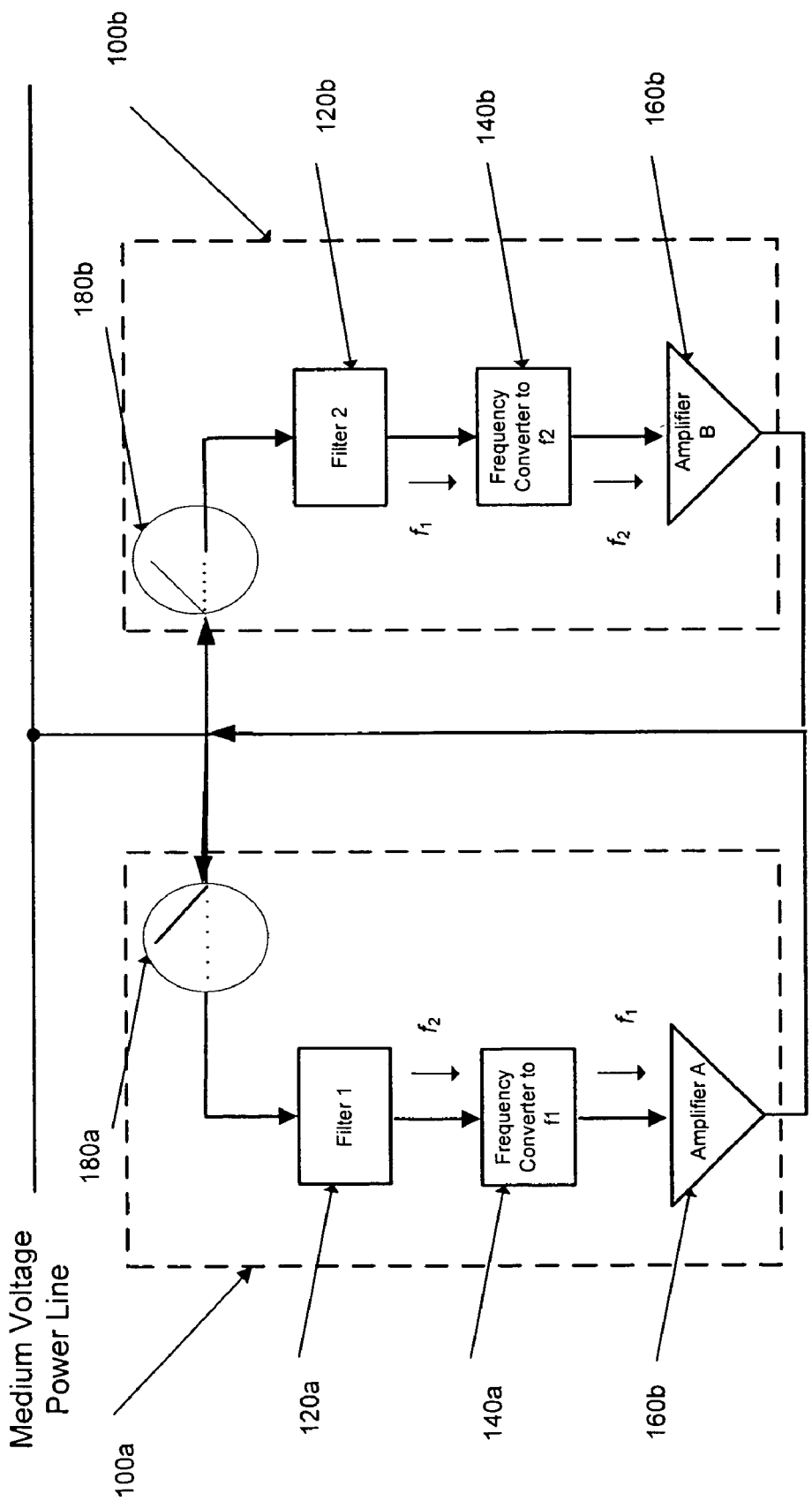
FIG. 6 is an amplification device in accordance with another example embodiment of the present invention.

Referring to FIG. 6, there is shown another alternative embodiment of the amplification device in accordance with the principles of the invention. Amplification devices 100a and 100b are coupled in parallel and jointly coupled to the medium voltage power line. Each of the amplification devices 100a, 100b includes its respective switches 180a, 180b, coupled to respective filters 160a, 160b. The filter outputs are coupled respectively to frequency converters 140a, 140b. Each amplification device 100a, 100b additionally includes respective amplifiers 160a, 160b.

Preferably, $f_1$ and $f_2$, the respective transmit frequencies of amplification devices 100a and 100b respectively, are orthogonal to each other. In operation, switch 180a of amplification device 100a engages in an open state when amplifier 160b is transmitting. Similarly, switch 180b of amplification device 100b engages in an open state when amplifier 160a is transmitting. By operating the switches 180 in a cross-linked manner (that is, amplifier 160a acts in conjunction with switch 180b of amplification device 100b and amplifier 160b acts in conjunction with switch 180a of amplification device 100a), two logical channels of data communication are created.

Figure 7:
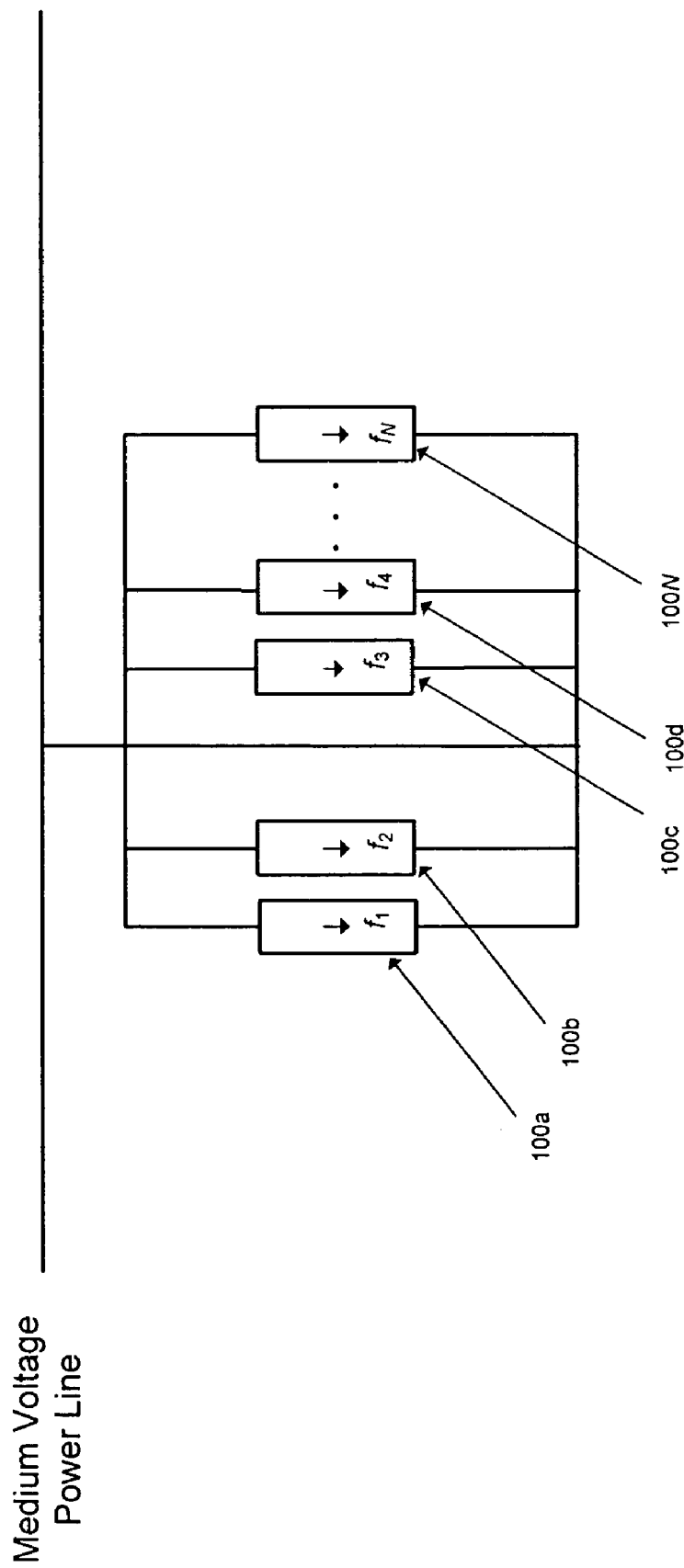
FIG. 7 is schematic block diagram of a parallel configuration of a plurality of amplification devices in accordance with an example embodiment of the present invention.

Referring to FIG. 7, there is shown a schematic block diagram of another alternative embodiment of the amplification device in accordance with the principles of the invention. Amplification devices 100a, 100b, 100c, . . . 100N are arranged in parallel and jointly coupled to the medium voltage power line. Each amplification device 100 may include a switch (not shown), filter (not shown), frequency converter (not shown) and amplifier (not shown). Preferably, the transmit frequency of each amplification device is orthogonal to the frequencies of each of the other amplification devices. That is, $f_1$ is orthogonal to every other transmit frequency ($f_2$, $f_3$, $f_4$, . . . $f_N$). Using an Orthogonal Frequency Division Multiplex Scheme (ODFM), multiple channels of broad band data signal transmission may be accomplished, even over multipath transmission lengths.

It should be noted that other modulation schemes may also be suitable for data signal transmission such as Code Division Multiple Access (CDMA), Time Division Multiple Access (TDMA) and Frequency Division Multiplex (FDM). A modulation scheme producing a wideband signal such as CDMA or OFDM that is relatively flat in the spectral domain may be used to reduce radiated interference to other systems while still delivering high data communication rates.

In one application of an example embodiment of the present invention, such as the example embodiments of FIG. 4 or FIG. 6, the device 100 may be in communication with a first PLC device (e.g., a BP, repeater, a BD, or other device 100) located in a first direction along the MV power line via a first frequency band and may be in communication with a second PLC device (e.g., a BP, repeater, a BD, or other device 100) located in a second direction along the MV power line via a second frequency band. In another application of the present invention, the amplification device 100 may be used to bypass data signals around the distribution transformer, in which case the output of the amplifier 160 may be coupled to a different power line conductor than that of the filter input. For example, the input of the filter 120a may be coupled to the MV power line and the output of the amplifier 160a may be coupled to the low voltage power line. Similarly, the input of the second filter 120b may be coupled to the LV power line and the output of the amplifier 160b may be coupled to the MV power line. Some such applications may alleviate the need to include switches.

A bi-directional amplification device for amplification of data signals over power line conductors has been disclosed. Advantageously, the described amplification device avoids the modulation and demodulation latency problems associated with repeaters while providing variable amplification to high frequency modulated data signals. Voice, video and other time sensitive data signal transmission may be delivered in a more efficient manner without undue latency. Advantageously, the described amplification device extends the physical range of data signals, especially on medium voltage power lines, thereby reducing the requirement for backhaul points and its associated backhaul media to traditional communication networks.

It is to be understood that the foregoing illustrative embodiments have been provided merely for the purpose of explanation and are in no way to be construed as limiting of the invention. Words used herein are words of description and illustration, rather than words of limitation. In addition, the advantages and objectives described herein may not be realized by each and every embodiment practicing the present invention. Further, although the invention has been described herein with reference to particular structure, materials and/or embodiments, the invention is not intended to be limited to the particulars disclosed herein. Rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention.

What is claimed is:

1. A device for amplifying data signals on an electric distribution network that includes a power line conductor, comprising:
   a filter having an input port and an output port,
   wherein said input port is configured to be directly coupled to the power line conductor;
   an amplifier having an input port and an output port;
   wherein said amplifier output port is configured to be directly coupled to the power line conductor;
   a frequency converter (FC) having an input port and an output port; and
   wherein said FC input port is communicatively coupled to said filter output port and said FC output port is communicatively coupled to said amplifier input port.

2. The device of claim 1, wherein said FC converts the frequency of the data signal from a first frequency to a second frequency.

3. The device of claim 2, wherein said first frequency is orthogonal to said second frequency.

4. The device of claim 2, wherein said first frequency and said second frequency are separated by a guard band.

5. The device of claim 1, wherein the gain of said amplifier is dependent upon the carrier frequency of said data signal.

6. The device of claim 1, wherein said amplifier is configured to predistort the data signal.

7. The device of claim 1, wherein said amplifier includes signal conditioning circuitry to condition the data signal after amplification of the data signal communication.

8. The device of claim 7, wherein said signal conditioning circuitry includes an anti-aliasing filter.

9. The device of claim 7, wherein said signal conditioning circuitry includes a noise filter.

10. The device of claim 1, wherein said input port of said filter is configured to be communicatively coupled to the power line via an inductive coupler.

11. The device of claim 1, wherein said input port of said filter is configured to be communicatively coupled to the power line via a capacitive coupler.

12. The device of claim 1, wherein said amplifier is configured to pre-emphasize to the data signal.

13. The device of claim 12, further comprising a power supply comprising a transformer configured to draw power from the power line and to supply power to said amplifier.

14. The device of claim 1, further comprising a buffer communicatively coupled to said first FC output port and said first amplifier input port.

15. The device of claim 14, wherein said buffer is configured to buffer an Internet Protocol packet.

16. The device of claim 14, wherein said buffer is configured to buffer a relay frame.

17. The device of claim 14, wherein said buffer is configured to buffer a Transmission Control Protocol datagram.

18. The device of claim 1, further comprising:
   a switch having an input port and an output port; and wherein said switch input port is communicatively coupled to the power line and wherein said switch output port is communicatively coupled to said filter input port.

19. The device of claim 18, wherein said switch is configured for operation in an open state and a closed state.

20. The device of claim 18, wherein said switch acts in conjunction with said amplifier.

21. The device of claim 20, wherein said switch engages in said open state when said amplifier is transmitting.

22. The device of claim 21, wherein said switch engages in said closed state when said amplifier is not transmitting.

23. A device for amplifying data signal on an electric distribution network that includes a power line conductor, comprising:
- a first switch and a second switch, said switches having an open state and a closed state, said switches having an input port and an output port, each of said switches having its input port directly coupled to the power line conductor;
- a first filter and a second filter, said filters having an input port and an output port, said input port of said first filter communicatively coupled to said output port of said first switch, said input port of said second filter communicatively coupled to said output port of said second switch;
- a first frequency converter (FC) and a second FC, said FCs having an input port and an output port, said input port of said first FC communicatively coupled to said output port of said first filter, said input port of said second FC communicatively coupled to said output port of said second filter; and
- a first amplifier and a second amplifier, said amplifiers having an input port and an output port, said input port of said first amplifier communicatively coupled to said output port of said first FC, said input port of second amplifier communicatively coupled to said output port of said second FC, said output ports of said first and said second amplifiers directly coupled to the power line conductor.

24. The device of claim 23, wherein said FCs convert the frequency band of the data signals from a first frequency to a second frequency.

25. The device of claim 23, wherein the power line conductor is a medium voltage power line.

26. The device of claim 23, wherein an output from said output port of said first FC is orthogonal to an output from said output port of said second FC.

27. The device of claim 23, wherein an output from said output port of said first FC and an output from said output port of said second FC are separated by a guard band.

28. The device of claim 23, wherein said first switch acts in conjunction with said second amplifier.

29. The device of claim 28, wherein said second switch acts in conjunction with said first amplifier.

30. The device of claim 23, wherein said first switch engages in said open state when said second amplifier is transmitting.

31. The device of claim 30, wherein said second switch engages in said open state when said first amplifier is transmitting.

32. The device of claim 31, wherein said first switch engages in said closed state when said second amplifier is not transmitting.

33. The device of claim 32, wherein said second switch engages in said closed state when said first amplifier is not transmitting.

34. An array of N amplification devices for amplifying data signals on a power line, wherein each of said amplification devices is characterized by a unique transmitting frequency f band, each of said amplification devices comprising:
- a switch configured for operating in an open state and a closed state, said switch having an input port and an output port, each switch having its input port directly coupled to the power line conductor;
- a filter having an input port and an output port, said input port of said filter directly coupled to said output port of said switch;
- a frequency converter (FC) having an input port and an output port, said input port of said FC communicatively coupled to said output port of said filter; and
- an amplifier having an input port and an output port, said input port of said amplifier communicatively coupled to said output port of said FC, said output port of said amplifier directly coupled to the power line conductor;
- wherein each of said unique transmitting frequencies f is orthogonal to each of said other frequencies.

* * * * *

UNITED STATES PATENT AND TRADEMARK OFFICE
CERTIFICATE OF CORRECTION

| | | |
|---|---|---|
| PATENT NO. | : 7,358,808 B2 | Page 1 of 1 |
| APPLICATION NO. | : 11/156612 | |
| DATED | : April 15, 2008 | |
| INVENTOR(S) | : Berkman | |

It is certified that error appears in the above-identified patent and that said Letters Patent is hereby corrected as shown below:

In the Drawings:
On Sheet 6 of 7, in Figure 6 (Referral Numeral 140a), line 3, delete "f1" and insert -- $f_1$ --, therefor.

On Sheet 6 of 7, in Figure 6 (Referral Numeral 140b), line 3, delete "f2" and insert -- $f_2$ --, therefor.

In column 6, lines 56-57, delete "bidirectional" and insert -- bi-directional --, therefor.

In column 8, line 48, after "processor" delete "an" and insert -- and --, therefor.

Signed and Sealed this

Thirtieth Day of March, 2010

David J. Kappos
*Director of the United States Patent and Trademark Office*